(12) United States Patent
Lamkin et al.

(10) Patent No.: US 6,298,048 B1
(45) Date of Patent: Oct. 2, 2001

(54) TDMA SYSTEM TIMER FOR MAINTAINING TIMING TO MULTIPLE SATELLITE SIMULTANEOUSLY

(75) Inventors: Allan B. Lamkin, San Diego; Michael Blakely, Encinitas; Richard Nouri; Katherine A. Killen, both of San Diego, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/069,339

(22) Filed: Apr. 29, 1998

(51) Int. Cl.$^7$ ............................... H04B 7/212; H04J 3/06
(52) U.S. Cl. ......................... 370/324; 370/350; 370/508
(58) Field of Search ................................... 370/321, 324, 370/337, 347, 350, 503, 508, 510, 516; 455/12.1, 13.2, 101, 504

(56) References Cited

U.S. PATENT DOCUMENTS 3,562,432 * 2/1971 Gabbard ............................... 370/324

(List continued on next page.)

OTHER PUBLICATIONS

Shark L–K et al, "New Synchronisation Method for Satellite–Switched Time–Division Multiple–Access Systems", Electronics Letters, Jun. 6, 1985, UK, vol. 21 No. 12, pp 547–548.

(List continued on next page.)

*Primary Examiner*—Melvin Marcelo
*Assistant Examiner*—Chiho Andrew Lee
(74) *Attorney, Agent, or Firm*—John T. Whelan; Michael W. Sales

(57) ABSTRACT

A method for timing correction in a communications receiver includes the steps of (a) setting a timer to a known value; (b) defining a first window by defining a first rollover value; (c) defining a second window by defining a second rollover value; (d) defining a first receive gate transition relative to the first rollover value; (e) defining a second receive gate transition relative to the second rollover value; (f) starting the timer; (g) receiving a first receive burst in the first window; (h) receiving a second receive burst in the second window; (i) if a first receive burst is received after the first receive gate transition, increasing the second rollover value, and decreasing the first rollover value by an equal amount; (j) if the first receive burst is received before the first receive gate transition, decreasing the second rollover value, and increasing the first rollover value by an equal amount; (k) if the second receive burst is received after the second receive gate transition, increasing the first rollover value, and decreasing the second rollover value by an equal amount; (l) if the second receive burst is received before the second receive gate transition, decreasing the first rollover value, and increasing the second rollover value by an equal amount; (m) if the first receive burst is received after the second receive gate transition, and the second receive burst is received after the second receive gate transition by a similar amount, increasing one of the first rollover value and the second rollover value at least one frame and then restoring the one of the first rollover value and the second rollover value; (n) if the first receive burst is received before the first receive gate transition, and the second receive burst is received before the second receive gate transition by a similar amount, decreasing one of the first rollover value and the second rollover value at least one frame and then restoring the one of the first rollover value and the second rollover value; (o) if the first receive burst is received time-shifted relative to the first receive gate transition, and the second receive burst is received time-shifted relative to the second receive gate transition by a different amount, adjusting the second rollover value including: if the second receive burst is received after the second receive gate transition, increasing the first rollover value, and decreasing the first rollover value by an equal amount; and if the second receive burst is received before the second receive gate transition, decreasing the first rollover value, and increasing the second rollover value by an equal amount; and then adjusting the first rollover value including: if a first receive burst is received after the first receive gate transition, increasing the second rollover value, and decreasing the first rollover value by an equal amount; and in the event the first receive burst is received before the first receive gate transition, decreasing the second rollover value, and increasing the first rollover value by an equal amount; and then adjusting the first rollover value to match an error between the second receive burst and the second receive gate transition.

17 Claims, 5 Drawing Sheets

U.S. PATENT DOCUMENTS

| | | | | |
|---|---|---|---|---|
| 3,730,998 | * | 5/1973 | Schmidt et al. | 370/324 |
| 4,472,802 | * | 9/1984 | Pin et al. | 370/324 |
| 4,642,806 | * | 2/1987 | Hewitt et al. | 370/324 |
| 4,686,673 | * | 8/1987 | Hotta | 370/324 |
| 4,712,212 | * | 12/1987 | Takai et al. | 370/324 |
| 5,072,445 | * | 12/1991 | Nawata | 370/324 |
| 5,229,996 | * | 7/1993 | Backstrom et al. | 370/324 |

OTHER PUBLICATIONS

Campanella S J, et al "Network Control for Multibeam TDMA and SS/TDMA" IEEE Journal on Selected Areas in Communications, Jan. 1983, USA, Vo. 1 SAC–1, No. 1, pp 174–187.

* cited by examiner

TDMA SYSTEM TIMER FOR MAINTAINING TIMING TO MULTIPLE SATELLITE SIMULTANEOUSLY

BACKGROUND OF THE INVENTION

The present invention relates to timing tracking in a communications receiver, and more particularly to timing tracking in the communications receiver relative to multiple communications transmitters. Even more particularly, the present invention relates to timing tracking in an earth-based communications receiver relative to multiple earth-orbit satellite transmitters.

Time division multiple access (TDMA) communications systems share bandwidth between multiple users by dividing a physical communications channel into discrete time slots. Transmission and reception are effected in bursts within a time slot structure. A TDMA timer is used to track system timing and generate control gates at proper times for the transmit and receive bursts within the time slot structure.

In a TDMA system where multiple transmitters, such as multiple earth-orbit satellite transceivers, are used for communication simultaneously, timing with each transmitter must be maintained.

In the multiple satellite transceiver environment, multiple TDMA timers account for different propagation delays and Doppler effects affecting the respective communications channels between an earth-based communications device and each satellite transceiver, as well as independently changing propagation delays for each satellite transceiver. Timing errors attributable to the TDMA timers themselves must also be accounted for.

Thus, prior art approaches dictate the use of a separate TDMA timer for each satellite transceiver from which a signal is to be tracked. Each TDMA timer, each of which may be, for example, a counter, may, in accordance with prior approaches, "roll over" on frame boundaries and thus provide an indication of relative timing within each frame. Transmit and receive bursts are defined relative to the frame boundaries for each frame. A roll over period of each TDMA timer may be adjusted, i.e., advanced or retarded to accommodate timing changes in the timing between the earth-based communications transceiver and the respective satellite transceiver. In accordance with the prior art systems, each TDMA timer tracks a different satellite transceiver, and independently adjusts its roll over to its particular satellite transceiver. Each TDMA timer also includes registers that define where transmit and receive bursts start and stop within the frame boundaries established for the respective satellite transceiver.

A generic TDMA timer tracks frame boundaries in conventional systems. Burst timing is modified, in the case of drift or changes in propagation delay, by modifying these frame boundaries. As a result, each frame is tied to these frame boundaries. If a single generic TDMA timer is used in a multi-satellite communications network, timing must be reset for each successive frame, including resetting the frame boundaries and resetting start and stop times for the transmit and receive bursts. Unfortunately, both time and power are expended in resetting timing on a frame by frame basis and thus such an approach is generally considered undesirable.

Thus, as outlined above, in conventional systems, individual TDMA timers are dedicated to each satellite transceiver from which communications are to be received and to which communications are to be transmitted. These single TDMA timers roll over on frame boundaries, i.e., reset to zero on frame boundaries, in order to remain synchronized with their respective satellite transceivers and keep track of frame time, accounting for timing errors, by adjusting this roll over. Since different satellites with which an earth-based transceiver may need to communicate have different timing, each of the single timers maintains and adjusts a different roll over. Each single TDMA timer also has registers that define where the transmit and receive bursts start and stop within the frames being tracked. Unfortunately, this approach requires several TDMA timers in each earth-based transceiver, which increases cost, power consumption and complexity.

The present invention advantageously addresses the above and other needs.

SUMMARY OF THE INVENTION

The present invention advantageously addresses the needs above as well as other needs by providing an approach to timing correction in a communications receiver, and more particularly by providing an approach to timing correction in the communications receiver relative to multiple communications transmitters.

In one embodiment, the present invention can be characterized as a method for timing correction in a communications receiver. The method includes the steps of (a) setting a timer to a known value; (b) defining a first window by defining a first roll over value; (c) defining a second window by defining a second roll over value; (d) defining a first receive gate transition relative to the first roll over value; (e) defining a second receive gate transition relative to the second roll over value; (f) starting the timer; (g) receiving a first receive burst in the first window; (h) receiving a second receive burst in the second window; (i) in the event a first receive burst is received after the first receive gate transition, increasing the second rollover value, and decreasing the first rollover value by an equal amount; (j) in the event the first receive burst is received before the first receive gate transition, decreasing the second rollover value, and increasing the first rollover value by an equal amount; (k) in the event the second receive burst is received after the second receive gate transition, increasing the first rollover value, and decreasing the second rollover value by an equal amount; (1) in the event the second receive burst is received before the second receive gate transition, decreasing the first rollover value, and increasing the second rollover value by an equal amount; (m) in the event the first receive burst is received after the first receive gate transition, and the second receive burst is receiver after the second receive gate transition by a similar amount, increasing one of the first rollover value and the second rollover value for at least one frame and then restoring the one of the first rollover value and the second rollover value; (n) in the event the first receive burst is received before the first receive gate transition, and the second receive burst is received before the second receive gate transition by a similar amount, decreasing one of the first rollover value and the second rollover value for at least one frame and then restoring the one of the first rollover value and the second rollover value; (o) in the event the first receive burst is received time-shifted relative to the first receive gate transition, and the second receive burst is received time-shifted relative to the second receive gate transition by a different amount, adjusting the second rollover value including: in the event the second receive burst is received after the second receive gate transition, increasing the first rollover value, and decreasing the second rollover value by an equal amount; and in the event the second receive burst is received before the second receive gate transition, decreasing the first rollover value, and increasing the second rollover value by an equal amount; and then adjusting the first rollover value including: in the event a first receive burst is received after the first receive gate transition, increasing the second rollover value, and decreasing the first rollover value by an equal amount; and in the event the first receive burst is received before the first receive gate transition, decreasing the second rollover value, and increasing the first rollover value by an equal amount; and then adjusting the first rollover value to match an error between the second receive burst and the second receive gate transition.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

The following describes a multi-satellite TDMA timer embodiment in accordance with the present invention. By way of example, the discussion below assumes a dual satellite environment with an 18 kilosymbol per second receive rate and a 36 kilosymbol per second transmit rate in a 40 millisecond frame composed of two 20 millisecond windows, each of which is composed of three time slots. The earth-based transceiver transmits and receives traffic once per frame when using one of the two satellites, and transmits and receives traffic twice per frame when using both satellites in a path-diversity environment. It will be understood by the skilled artisan that more than two satellites can be used by adding new control registers appropriate to each set, and by, for example, further subdividing the frame in order to transmit and receive to/from each satellite during each frame, or by transmitting and receiving to/from each satellite, for example, every other frame.

Figure 1:
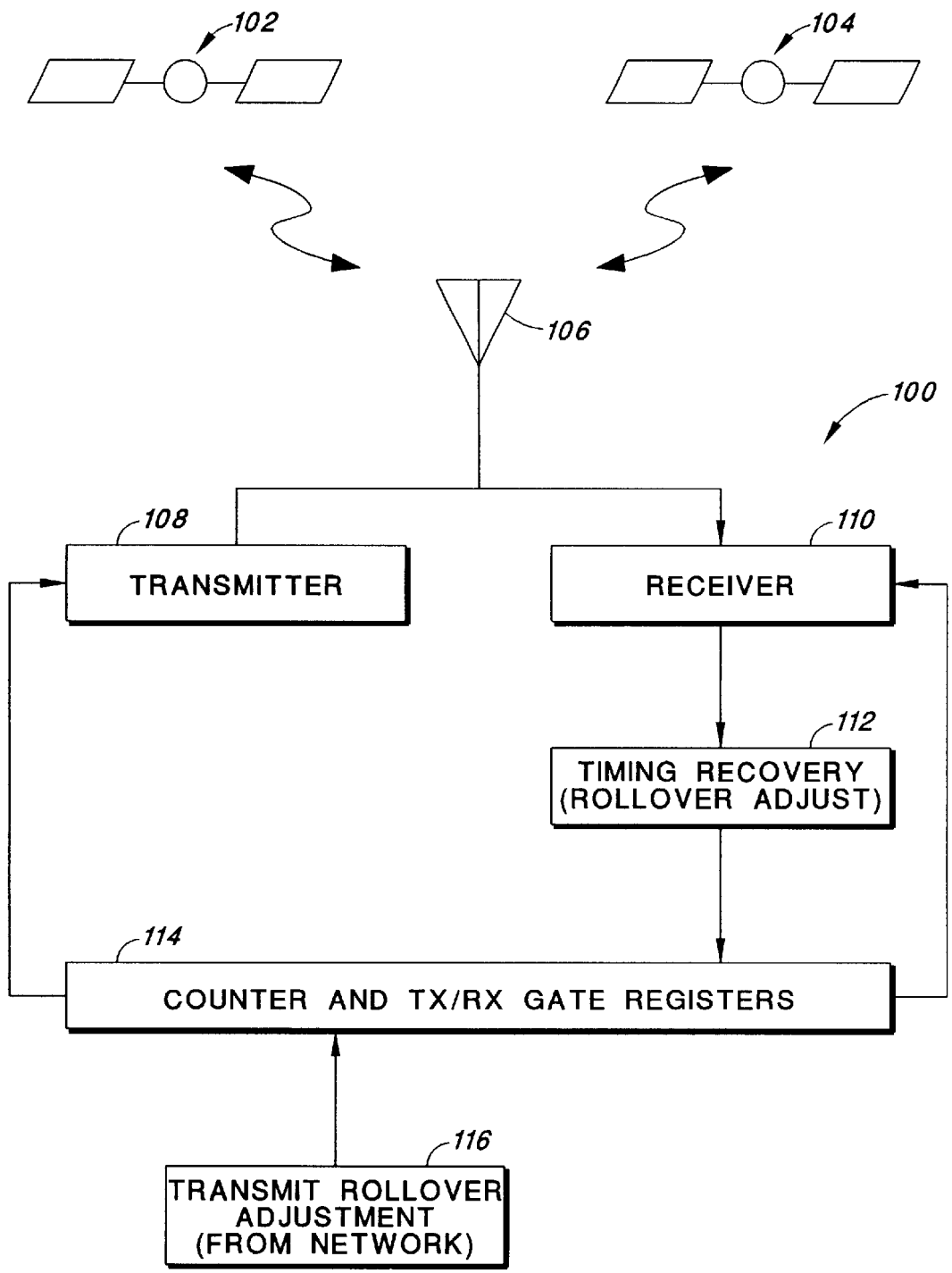
FIG. 1 is a block diagram of an earth-based transceiver in accordance with the present invention and two satellite transceivers.

Referring to FIG. 1, a block diagram is shown of an earth-based transceiver 100 in accordance with the present invention and two satellite transceivers 102, 104. The earth-based transceiver 100 is comprised of an antenna 106, a transmitter 108, a receiver 110, a timing recovery system 112, a counter and transmit/receive gate registers 114, and a transmit rollover adjustment system 116. In accordance with the present embodiment, the transmitter 108 is used to transmit signals via the antenna 106 to the two satellites 102, 104, and the receiver 110 is used to receive signals from the two satellites 102, 104 via the antenna 106. Upon receipt of signals from the two satellites 102, 104, the timing and recovery system 112 evaluates whether adjustment is needed in the rollover for either of two windows within a frame based on determined synchronization between receive gates for each of the two satellites 102, 104 and signals received from each of the two satellites 102, 104. Upon indication that an adjustment to rollover is needed, the timing recovery system signals the counter to effect such an adjustment. The transmit rollover adjustment system functions in a manner similar to that in which the timing recovery system functions, except that it adjusts timing for the transmit gates for each of the satellites. Furthermore, the transmit rollover adjustment system makes its adjustments based on an indication of transmit gate positioning received from a satellite network via the two satellites, as opposed to independent determination of timing error based on synchronization between the transmit gates and the transmitted burst. (Synchronization between the transmit gates and the transmitted burst will always be very nearly perfect as the transmitter doing the transmitting is part of the transceiver that defines the transmit gates. The satellite network makes a determination as to how closely the transmit bursts at the earth-based transceiver match their defined transmit gates and thus can effect adjustments in the transmit gate positioning within each window frame).

The transmitter 108 transmits signals during the transmit gates as defined by the counter and transmit/receive gate registers 114, and the transmit rollover adjustment system 116.

Figure 2:
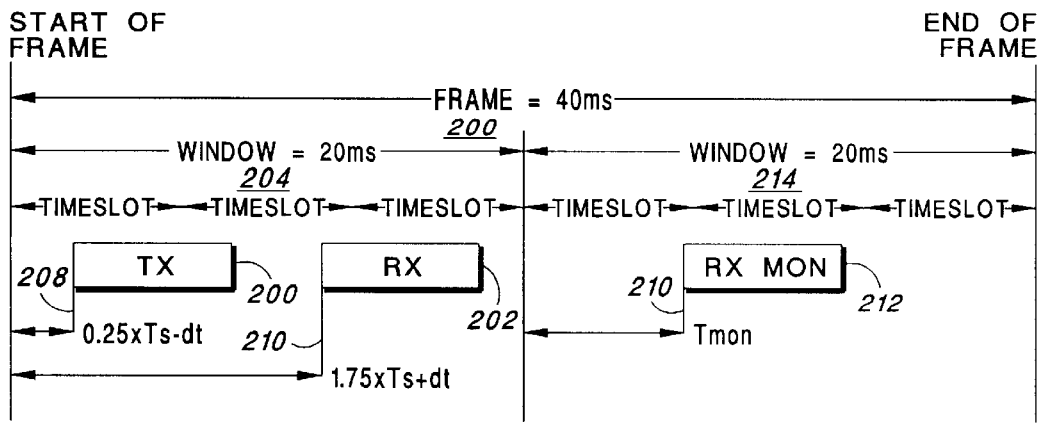
FIG. 2 is an exemplary timing diagram representing a traffic burst structure (frame structure) in which transmit and receive bursts are represented between the earth-based transceiver of FIG. 1 and a single satellite transceiver.

Referring to FIG. 2, a timing diagram is shown of a frame in which path-diversity is not employed. Transmit and receive bursts 200, 202 are shown in a first window 204 of a frame 206 with a start time 208 for the transmit burst 200 being defined as $$T_{start\text{-}of\text{-}TX\text{-}bursts} = T_{start\text{-}of\text{-}frame} + (0.25 \times T_s) - dt$$

where $T_s$ is the length of a time slot, which in this example is 6.67 milliseconds, and dt is a difference in burst position relative to a nominal position, which in the case shown is greater than -31 1.4 milliseconds and less than +1.4 milliseconds from nominal. $T_{start\text{-}of\text{-}frame}$ is a time at which the frame starts. The start time 210 of the received burst is defined as $$T_{start\text{-}of\text{-}RX\ bursts} = T_{start\text{-}of\text{-}frame} + (1.75 \times T_s) + dt$$

where $T_s$ is the length of a time slot, e.g., 6.67 milliseconds, and dt is a difference in burst position relative to a nominal position (−1.4 milliseconds<dt+1.4 milliseconds). The parameter dt accounts for differences, i.e., error, in propagation delay between the satellite and the particular location at which the earth-based transceiver is located.

A receive burst 212 in a second window 214 of the frame 206 is a monitor burst 212. The monitor burst 212 is used to monitor control channels of other satellite transceivers in preparation for hand-off. Because the timing of these other control channels, however, is asynchronous with respect to the timing of the satellite from which the transmit and receive bursts 200, 202 are transmitted to and received from, a start time 216 of the monitor burst 212 cannot be defined in terms of the length of a time slot and the difference in burst position relative to a nominal position. Due to limitations in the earth-based transceiver 100, complete discretion in placement of the monitor burst within the second window is not generally possible. $T_{mon}$ defines a position of the monitor bursts and the monitor burst is restricted to the minimum length of 0.25 milliseconds and a maximum length of 13.08 milliseconds.

Figure 3:
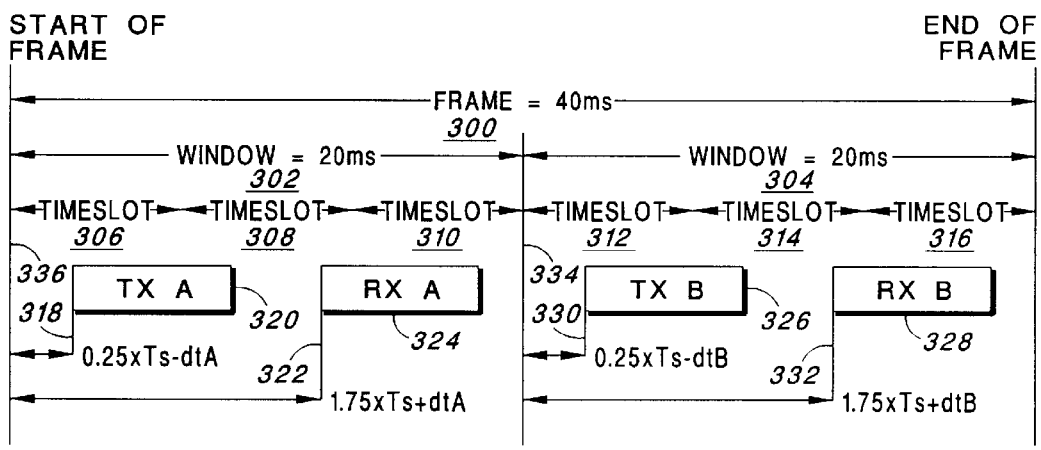
FIG. 3 is an exemplary timing diagram representing a traffic burst structure in which transmit and receive bursts are represented between the earth-based transceiver of FIG. 1 and two satellite transceivers.

Referring next to FIG. 3, frame diversity is illustrated. Shown is a frame 300, two windows 302, 304 representing first and second halves of the frame 300, and time slots 306, 308, 310, 312, 314, 316 that divide each window 302, 304 into three equal portions. A start time 318 of a transmit burst 320 and a start time 322 of a receive burst 324 in a first window 302 are defined, as described above, in reference to FIG. 2. Because in the present example, path diversity is employed, a second window 306 also contains a transmit burst 326 and receive burst 328. The burst start times 330, 332 for the transmit and receive bursts 326, 328 in the second window 304 are defined relative to a start 334 of the second window 304 instead of a start 336 of the frame 300, but are otherwise defined the same as the transmit and receive bursts 320, 324 in the first window 308. Because the difference in burst position relative to nominal positions may be different for the transmit and receive bursts 320, 324 in the first window 302 than for the transmit and receive bursts 326, 328 in the second window 304, two differences in burst position relative to nominal position are defined, i.e., $dt_A$ and $dt_B$.

The TDMA timer (or counter and transmit/receive gate registers) 114 has two sources of timing errors: (1) changes in propagation delay; and (2) variations between system time reference, i.e., timing reference at the satellite transceivers 102, 104 and TDMA timing reference, i.e., timing reference at the earth-based transceiver 100. Timing errors will cause the TDMA timer 114 and the earth-based transceiver 100 to generate a transmit burst and to look for receive bursts at wrong times. The present embodiment is tolerant of small timing errors, but larger timing errors must be corrected in accordance with the teachings herein. To correct for changes in propagation delay, the parameters $dt_A$ and $dt_B$ must be adjusted. To correct for differences between timing references, the start 334, 336 of each window 302, 304 must be advanced or retarded.

As with prior art designs, the present TDMA timer 114 is based on the counter. An input clock, for example, is a 720 kHz clock, which is 40 times the receive symbol rate, and 20 times each transmit symbol rate. The counter starts counting from zero at the start of a window. The counter increments every $$\frac{1}{720} \text{ kHz,}$$

which equals 1.39 microseconds, until it reaches an end of a window, which normally occurs when the counter reaches 14,400. At this point, a counter "rolls over" to zero and starts a next window.

Figure 4:
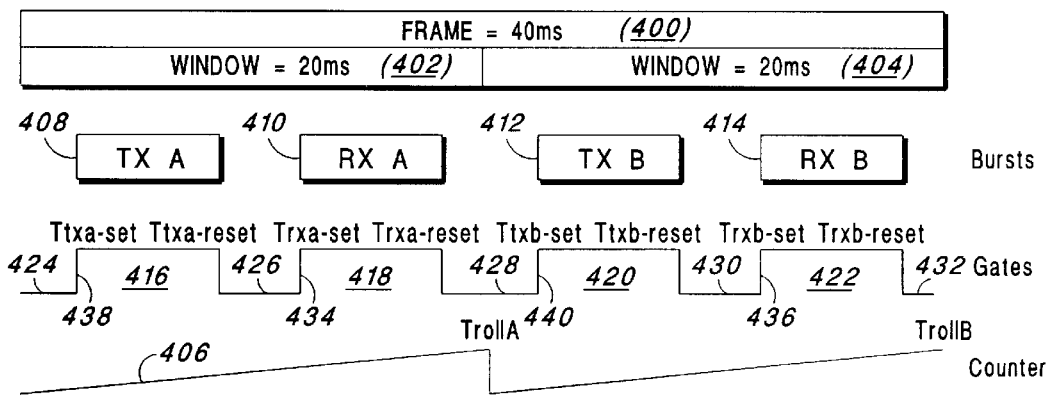
FIG. 4 is an exemplary timing diagram representing a traffic burst structure in which function of a TDMA counter is depicted along with a traffic burst structure in which transmit and receive bursts are represented between the earth-based transceiver of FIG. 1 and two satellite transceivers.

Referring next to FIG. 4, counter operation is illustrated. Shown is a frame 400, with two equal windows 402, 404 making up first and second halves of the frame 400. A saw tooth waveform 406 represents a value in the counter (the counterpoint) as it counts from zero to its roll over value (i.e., maximum value). Two programmable roll over values, $roll_A$ and $roll_B$, are employed in accordance with the present invention. The counter alternates between counting up to each of the two roll over values. The position of the transmit and receive bursts 408, 410, 412, 414 within each window is also shown. (Note that in this example path diversity is employed, with transmit and receive bursts 408, 410 to/from a first satellite occurring in a first window 402, and transmit and receive bursts 412, 414 to/from a second satellite occurring in a second window 404.) Also shown are gate states 416, 418, 420, 422, 424, 426, 428, 430, 432 that are used to generate timing for the transmit and receive bursts 408, 410, 412, 414. The gates are turned on 416, 418, 420, 422 and off 424, 426, 428, 430, 432 by a group of set and reset registers in the TDMA timer 114. When the counter value (or counterpoint) equals the value stored in the set or reset registers, an associated gate is turned on or off, accordingly.

When first configuring a traffic channel, both roll over registers should be set to nominal values of $roll_A = roll_B = 14,400$. The positions of gate transitions are calculated using $T_s$. and dt. $T_s$. is constant at 6.6 milliseconds, which equals 2400 counter intervals and dt is supplied by the satellite network. (If a particular traffic channel does not use path diversity, only one group of preset registers is employed such as in the example of FIG. 2.).

An initial configuration of the counter roll overs and the gate timing will generally function without change for a number of frames. When timing errors begin to accumulate, however, adjustment of the counter rollovers and the gate timing is required. Timing errors are indicated by a shift of the received bursts relative to the received gate transitions. When this occurs, roll over values are changed to realign the receive gate to transitions with the receive bursts. By changing the roll over value, instead of the gate transition timing, only one or two registers need to be changed.

Referring still to FIG. 4, receive bursts 410, 414 could move relative to receive gate transitions in the followings ways:

1. If the receive burst 410 in the first window 402 shifts right relative to a receive gate transition 434 in the first window 402, then a $roll_B$ must be increased, and $roll_A$ must be decreased by an equal amount to shift the receive gate transition to the right, i.e., later in time.

2. If the receive burst 410 in the first window 402 shifts left relative to the receive gate transition 434, then $roll_B$ must be decreased, and $roll_A$ must be increased by an equal amount to shift the receive gate transition 434 to the left, i.e., earlier in time.

3. If a receive burst 414 in a second window 404 shifts right relative to a receive gate transition 436 in the second window 404, then $roll_A$ must be increased, and $roll_B$ must be decreased by an equal amount to shift the receive gate transition 436 to the right, i.e., later in time.

4. If the receive burst 414 in the second window 404 shifts left relative to the receive gate transition 436, then $roll_A$ must be decreased and $roll_B$ must be increased an equal amount to shift the receive gate transition 436 to the left, i.e., backward in time.

5. If both the receive burst 410 in the first window 402 and the receive burst 414 in the second window 404 shift to the right relative to their respective receive gate transitions 434, 436 by similar amounts, then either $roll_A$ or $roll_B$ must be increased, for one frame only, to shift the receive gate transitions 434, 436 for both receive bursts 410, 414 to the right, i.e., later in time.

6. If both the receive burst 410 in the first window 402 and the receive burst 414 in the second window 404 shift left relative to their respective receive gate transitions 434, 436 by similar amounts, then either $roll_A$ or $roll_B$ must be decreased for one frame only, to shift the receive gate transitions 434, 436 for both receive bursts 410, 414 to the left, i.e., earlier in time.

7. If the receive burst 410 in the first window 402 shifts relative to its receive gate transition 434, and then the receive burst 414 in the second window 404 shifts a different amount relative to its receive gate transition 436, $roll_B$ must first be adjusted as described in numbered paragraphs 1 or 2, above, and then $roll_A$ must be adjusted in accordance with the descriptions above in paragraphs 3 or 4. The adjustment of $roll_B$ is the same as the error between the receive burst 410 in the first window 402 and its associated gate transition 434. The adjustment of $roll_A$ is the same as an amount of error between the receive burst 414 in the second window 404 and its associated gate transition 436 minus the amount of error between the receive burst 410 in the first window 402 and its associated gate transition 434. Finally, $roll_A$ is adjusted to match the error between the receive burst 414 in the second window 404 and its associated gate transition 436.

If timing errors are due to differences between the satellite network timing reference and TDMA timer timing references, realigning the receive gate transitions 434, 436 with the corresponding receive bursts 410, 414 will correct such timing errors. This type of error most often manifests itself with both the receive burst 414 in the second window 404 and the receive burst 410 in the first window 402 shifting by similar amounts in the same temporal direction, as in paragraphs 5 and 6 above. Because the adjustment for this type of error only occurs for one frame, the $roll_A$ and $roll_B$ registers will usually contain their nominal values of 14,400.

If timing errors are due to changes in propagation delay, the value of the difference in burst position relative to nominal position (dt) changes over time. Moving one or both receive gate transitions 434, 436 to track their respective receive bursts 410, 414 under this condition will cause transmit gate transitions 438, 440 to move temporally in a wrong direction. Once transmit burst timing error crosses a threshold, the satellite network will command a change in the timing of one or both of the transmit bursts 408, 412. The transmit burst position ($T_{start-of-TX-burst}$) is defined by $T_s$ (a constant) and dt, so the satellite network moves the transmit bursts 408, 412 by sending a new value for dt. When the network provides a new dt, the counter should be reinitialized, setting $roll_A$ equal to $roll_B$ equal to 14,000 and configuring the gate translations 434, 436, 438, 440 according to the new value of dt.

EXAMPLE 1

Bursts are allowed to move 600 to 1200 counter intervals before counteractions are made. This constraint is made in order to assure that the direction and amount of movement in the transmit and receive bursts is clear. In actual systems, corrections may be made with the error between gate transitions and bursts as small as one counter interval.

Figure 5:
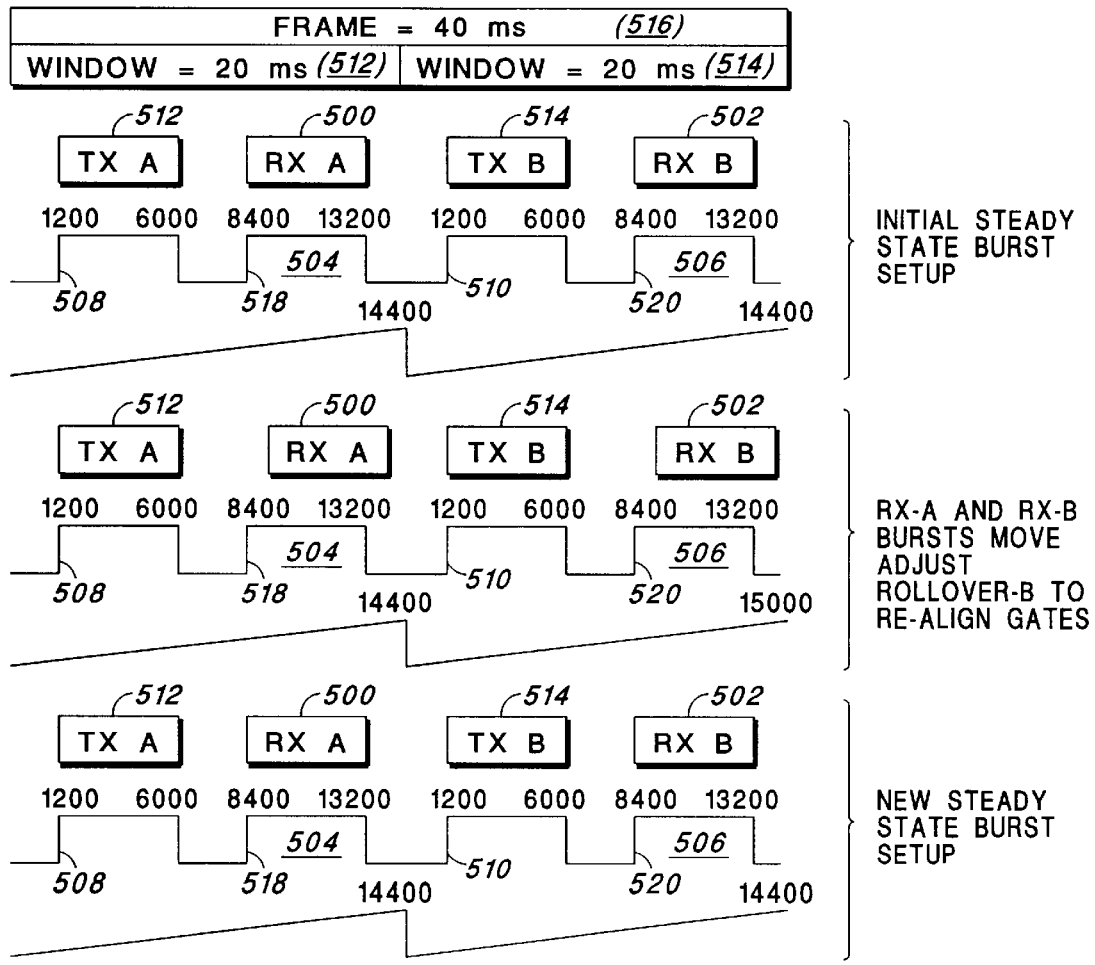
FIG. 5 is an exemplary timing diagram representing timing error and adjustment in a traffic burst structure in which transmit and receive bursts are represented between the earth-based transceiver of FIG. 1 and two satellite transceivers.

By referring next to FIG. 5, a timing correction is illustrated such as when error due to differences in the satellite network timing reference and TDMA timer timing reference occur. This timing error is characterized by both receive bursts 500, 502 shifting right relative to their receive gate 504, 506. This causes both transmit gate transitions 508, 510 to be shifted right relative to when the satellite network expects the transmit bursts 512, 514 to be transmitted and thus, in effect, also shifts both windows 512, 514 and the frame 516 to the right. This occurs when the TDMA timer timing reference is faster than the satellite network timing reference. In the present example, the magnitude of the error is 600 counter intervals. To correct the error, $roll_B$ is extended by 600 (from 14,400 to 15,000), -for one frame, which brings the transmit and receive gate transitions 508, 510, 518, 520 back into alignment with the timing of the satellite network.

EXAMPLE 2

Figure 6:
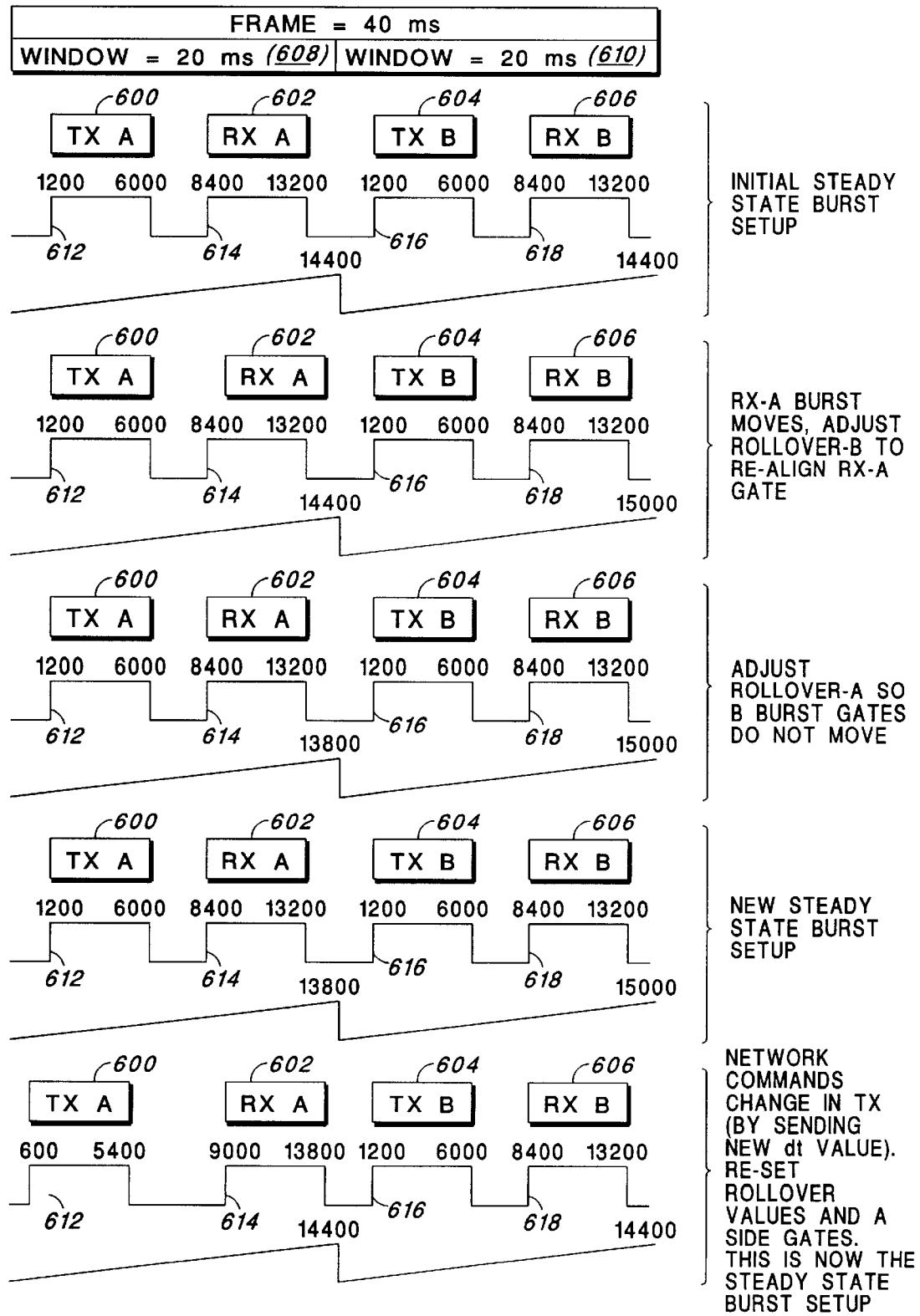
FIG. 6 is an exemplary timing diagram representing timing propagation delay error and adjustment in a traffic burst structure in which transmit and receive bursts are represented between the earth-based transceiver of FIG. 1 and two satellite transceivers.

Referring next to FIG. 6, timing error and correction are shown when timing error is due to a change in propagation delay from a satellite transceiver to an earth-based transceiver is encountered. The initial conditions are that differences in transmit and receive burst 600, 602, 604, 606 positions relative to nominal positions for both the first window 608 and the second window 610 are 0 ($dt_A = dt_B = 0$) to establish positions for the gate transitions 612, 614, 616, 618. The timing error is characterized in the receive burst 602 in the first window 608, as a shift to the right (forward in time) relative to its corresponding receive gate transition 614. Such occurs when propagation delay from a satellite transceiver transmitting and receiving in the first window 608 is increasing, and propagation delay from a satellite transceiver transmitting and receiving in the second window 610 is unchanged. The magnitude of the error in this example is 600 counter intervals. To correct this error, $roll_B$ is extended by 600 (14,400 to 15,000) and $roll_A$ is reduced by 600 (14,400 to 13,800). This becomes a new steady state for the TDMA timer. Because this condition shifts the transmit burst 600 in the wrong direction (to the right instead of to the left), the satellite transceiver transmitting and receiving in the first window 608 commands a change in the location of the transmit gate transitions 612, 616 and thus the transmit burst 600 by providing a new value for the difference in burst position relative to nominal position ($dt_A$). The new difference ($dt_A$) equals 600 counter intervals, which is the same amount by which $roll_A$ and $roll_B$ adjusted, and represents a shift to the left, or earlier in time, which is the same direction as the shift in $roll_A$, but opposite the direction of the shift in $roll_B$. The TDMA timer is then reinitialized, setting the rollover registers to 14,000, and adjusting the gate transition positions according to the new value of the difference ($dt_A$), which is equal to 600.

EXAMPLE 3

Figure 7:
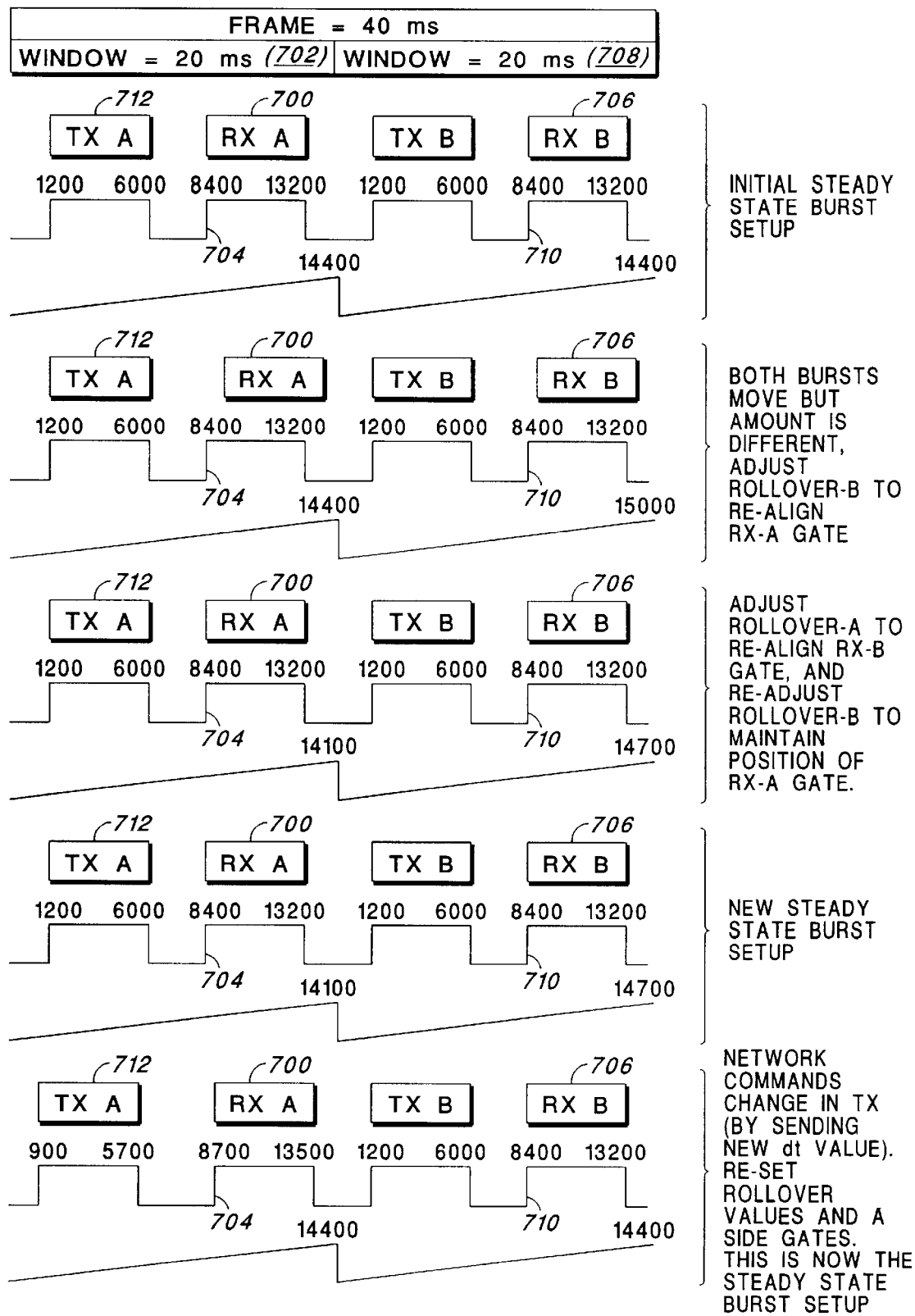
FIG. 7 is an exemplary timing diagram representing simultaneous air conditions in a traffic burst structure in which transmit and receive bursts are represented between the earth-based transceiver of FIG. 1 and two satellite transceivers.

Referring next to FIG. 7, a timing correction is shown wherein both propagation delay and timing reference errors occur simultaneously. This type of timing error is characterized by the receive burst 700 in the first window 702 shifting to the right relative to its corresponding receive gate transition 704, and the receive burst 706 in the second window 708 also shifting right relative to its corresponding receive gate transition 710, but with the receive burst 700 in the first window 702 shifting twice as far to the right as the receive burst 706 in the second window 708. This occurs when propagation delay from the satellite transceiver transmitting and receiving in the first window 702 is increasing, and propagation delay from the satellite transceiver transmitting and receiving in the second window 708 is unchanged, and when at the same time the TDMA timer timing reference is faster than the satellite timing reference. The magnitude of the receive burst error in the first window 702 is 600 counter intervals and the magnitude of the receive burst error in the second window 708 is 300 counter intervals. To correct the error, $roll_B$ is extended by 600 (14,400 to 15,000), and $roll_A$ is reduced by 300 (14,400 to 14,100). Then, $roll_B$ is reduced by 300 (15,000 to 14,700). This becomes a new steady state for the counter. Because this correction shifts the transmit burst 712 in the first window 702 in a wrong direction (to the right instead of to the left), the satellite transceiver commands a change in the location of the transmit burst 712 by providing a new value for the difference in burst position relative to nominal position ($dt_A$). The new difference ($dt_A$) is 300 counter intervals, which is the same net amount by which $roll_A$ and $roll_B$ are adjusted, and represents a shift to the left, or earlier in time, which is the same direction as the net shift in $roll_A$, but opposite the direction of the net shift in $roll_B$. The TDMA timer is then reinitialized, setting the rollover registers to 14,400, and adjusting the gate positions according to the new value of the difference ($dt_A$), which is equal to 300.

While the invention herein disclosed has been described by means of specific embodiments and applications thereof, numerous modifications and variations could be made thereto by those skilled in the art without departing from the scope of the invention set forth in the claims.

What is claimed is:

1. A method for timing correction in a communications receiver comprising:

setting a timer to a known value;

defining a first window by a defining a first rollover value;

defining a second window by defining a second rollover value;

defining a first receive gate transition relative to the first rollover value;

defining a second receive gate transition relative to the second rollover value;

starting the timer;

receiving a first receive burst in the first window;

receiving a second receive burst in the second window;

in the event a first receive burst is received after the first receive gate transition, increasing the second rollover value, and decreasing the first rollover value by an equal amount;

in the event the first receive burst is received before the first receive gate transition, decreasing the second rollover value, and increasing the first rollover value by an equal amount;

in the event the second receive burst is received after the second receive gate transition, increasing the first rollover value, and decreasing the second rollover value by an equal amount;

in the event the second receive burst is received before the second receive gate transition, decreasing the first rollover value, and increasing the second rollover value by an equal amount;

in the event the first receive burst is received after the first receive gate transition, and the second receive burst is received after the second receive gate transition by a similar amount, increasing one of the first rollover value and the second rollover value for at least one frame and then restoring the one of the first rollover value and the second rollover value;

in the event the first receive burst is received before the first receive gate transition, and the second receive burst is received before the second receive gate transition by a similar amount, decreasing one of the first rollover value and the second rollover value for at least one frame and then restoring the one of the first rollover value and the second rollover value;

in the event the first receive burst is received time-shifted relative to the first receive gate transition, and the second receive burst is received time-shifted relative to the second receive gate transition by a different amount, adjusting the second rollover value including:

in the event the second receive burst is received after the second receive gate transition, increasing the first rollover value, and decreasing the first rollover value by an equal amount;

in the event the second receive burst is received before the second receive gate transition, decreasing the first rollover value, and increasing the second rollover value by an equal amount; and then adjusting the first rollover value including:

in the event a first receive burst is received after the first receive gate transition, increasing the second rollover value, and decreasing the first rollover value by an equal amount;

in the event the first receive burst is received before the first receive gate transition, decreasing the second rollover value, and increasing the first rollover value by an equal amount; and then adjusting the first rollover value to match an error between the second receive burst and the second receive gate transition.

2. A method for timing correction in a communications receiver comprising:

setting a timer to a known value;

defining a first window by defining a first rollover value;

defining a second window by defining a second rollover value;

defining a first receive gate transition relative to the first rollover value;

defining a second receive gate transition relative to the second rollover value;

starting the timer;

receiving a first receive burst in the first window;

receiving a second receive burst in the second window;

in the event a first receive burst is received after the first receive gate transition, increasing the second rollover value, and decreasing the first rollover value by an equal amount; and in the event the first receive burst is received before the first receive gate transition, decreasing the second rollover value, and increasing the first rollover value by an equal amount.

3. The method of claim 2 further comprising:

in the event the second receive burst is received after the second receive gate transition, increasing the first rollover value, and decreasing the second rollover value by an equal amount; and in the event the second receive burst is received before the second receive gate transition, decreasing the first rollover value, and increasing the second rollover value by an equal amount.

4. The method of claim 2 further comprising:

in the event the first receive burst is received after the first receive gate transition, and the second receive burst is received after the second receive gate transition by a similar amount, increasing one of the first rollover value and the second rollover value for at least one frame and then restoring the one of the first rollover value and the second rollover value; and in the event the first receive burst is received before the first receive gate transition, and the second receive burst is received before the second receive gate transition by a similar amount, decreasing one of the first rollover value and the second rollover value for at least one frame and then restoring the one of the first rollover value and the second rollover value.

5. The method of claim 3 further comprising:

in the event the first receive burst is received time-shifted relative to the first receive gate transition, and the second receive burst is received time-shifted relative to the second receive gate transition by a different amount, adjusting the second rollover value including:

in the event the second receive burst is received after the second receive gate transition, increasing the first rollover value, and decreasing the first rollover value by an equal amount;

in the event the second receive burst is received before the second receive gate transition, decreasing the first rollover value, and increasing the second rollover value by an equal amount; and then adjusting the first rollover value including:

in the event a first receive burst is received after the first receive gate transition, increasing the first rollover value, and decreasing the second rollover value by an equal amount; and in the event the first receive burst is received before the first receive gate transition, decreasing the second rollover value, and increasing the first rollover value by an equal amount; and then adjusting the first rollover value to match an error between the second receive burst and the second receive gate transition.

6. A method for timing correction in a communications receiver comprising:

setting a timer to a known value;

defining a first window by defining a first rollover value;

defining a second window by defining a second rollover value;

defining a first receive gate transition relative to the first rollover value;

defining a second receive gate transition relative to the second rollover value;

starting the timer;

receiving a first receive burst in the first window;

receiving a second receive burst in the second window;

in the event the second receive burst is received after the second receive gate transition, increasing the first rollover value, and decreasing the second rollover value by an equal amount; and in the event the second receive burst is received before the second receive gate transition, decreasing the first rollover value, and increasing the second rollover value by an equal amount.

7. The method of claim 6 further comprising:

in the event a first receive burst is received after the first receive gate transition, increasing the second rollover value, and decreasing the first rollover value by an equal amount; and in the event the first receive burst is received before the first receive gate transition, decreasing the second rollover value, and increasing the first rollover value by an equal amount.

8. The method of claim 6 further comprising:

in the event the first receive burst is received after the first receive gate transition, and the second receive burst is received after the second receive gate transition by a similar amount, increasing one of the first rollover value and the second rollover value for at least one frame and then restoring the one of the first rollover value and the second rollover value; and in the event the first receive burst is received before the first receive gate transition, and the second receive burst is received before the second receive gate transition by a similar amount, decreasing one of the first rollover value and the second rollover value for at least one frame and then restoring the one of the first rollover value and the second rollover value.

9. The method of claim 8 further comprising:

in the event the first receive burst is received time-shifted relative to the first receive gate transition, and the second receive burst is received time-shifted relative to the second receive gate transition by a different amount, adjusting the second rollover value including:

in the event the second receive burst is received after the second receive gate transition, increasing the first rollover value, and decreasing the first rollover value by an equal amount;

in the event the second receive burst is received before the second receive gate transition, decreasing the first rollover value, and increasing the second rollover value by an equal amount; and then adjusting the first rollover value including:

in the event a first receive burst is received after the first receive gate transition, increasing the second rollover value, and decreasing the first rollover value by an equal amount; and in the event the first receive burst is received before the first receive gate transition, decreasing the second rollover value, and increasing the first rollover value by an equal amount; and then adjusting the first rollover value to match an error between the second receive burst and the second receive gate transition.

10. A method for timing correction in a communications receiver comprising:

setting a timer to a known value;

defining a first window by defining a first rollover value;

defining a second window by defining a second rollover value;

defining a first receive gate transition relative to the first rollover value;

defining a second receive gate transition relative to the second rollover value;

starting the timer;

receiving a first receive burst in the first window;

receiving a second receive burst in the second window;

in the event the first receive burst is received after the first receive gate transition, and the second receive burst is received after the second receive gate transition by a similar amount, increasing one of the first rollover value and the second rollover value for at least one frame and then restoring the one of the first rollover value and the second rollover value; and in the event the first receive burst is received before the first receive gate transition, and the second receive burst is received before the second receive gate transition by a similar amount, decreasing one of the first rollover value and the second rollover value for at least one frame and then restoring the one of the first rollover value and the second rollover value.

11. The method of claim 10 further comprising:

in the event the second receive burst is received after the second receive gate transition, increasing the first rollover value, and decreasing the second rollover value by an equal amount; and in the event the second receive burst is received before the second receive gate transition, decreasing the first rollover value, and increasing the second rollover value by an equal amount.

12. The method of claim 10 further comprising:

in the event a first receive burst is received after the first receive gate transition, increasing the second rollover value, and decreasing the first rollover value by an equal amount; and in the event the first receive burst is received before the first receive gate transition, decreasing the second rollover value, and increasing the first rollover value by an equal amount.

13. The method of claim 12 further comprising:

in the event the first receive burst is received time-shifted relative to the first receive gate transition, and the second receive burst is received time-shifted relative to the second receive gate transition by a different amount, adjusting the second rollover value including:

in the event the second receive burst is received after the second receive gate transition, increasing the first rollover value, and decreasing the first rollover value by an equal amount;

in the event the second receive burst is received before the first receive gate transition, decreasing the first rollover value, and increasing the second rollover value by an equal amount; and then adjusting the first rollover value including:

in the event a first receive burst is received after the first receive gate transition, increasing the second rollover value, and decreasing the first rollover value by an equal amount; and in the event the first receive burst is received before the first receive gate transition, decreasing the second rollover value, and increasing the first rollover value by an equal amount; and then adjusting the first rollover value to match an error between the second receive burst and the second receive gate transition.

14. A method for timing correction in a communications receiver comprising:

setting a timer to a known value;

defining a first window by defining a first rollover value;

defining a second window by defining a second rollover value;

defining a first receive gate transition relative to the first rollover value;

defining a second receive gate transition relative to the second rollover value;

starting the timer;

receiving a first receive burst in the first window;

receiving a second receive burst in the second window;

in the event the first receive burst is received time-shifted relative to the first receive gate transition, and the second receive burst is received time-shifted relative to the second receive gate transition by a different amount, adjusting the second rollover value including:

in the event the second receive burst is received after the second receive gate transition, increasing the first rollover value, and decreasing the first rollover value by an equal amount;

in the event the second receive burst is received before the second receive gate transition, decreasing the first rollover value, and increasing the second rollover value by an equal amount; and then adjusting the first rollover value including:

in the event a first receive burst is received after the first receive gate transition, increasing the second rollover value, and decreasing the first rollover value by an equal amount; and in the event the first receive burst is received before the first receive gate transition, decreasing the second rollover value, and increasing the first rollover value by an equal amount; and then adjusting the first rollover value to match an error between the second receive burst and the second receive gate transition.

15. The method of claim 14 further comprising:

in the event the second receive burst is received after the second receive gate transition, increasing the first rollover value, and decreasing the second rollover value by an equal amount; and in the event the second receive burst is received before the second receive gate transition, decreasing the first rollover value, and increasing the second rollover value by an equal amount.

16. The method of claim 15 further comprising:

in the event the first receive burst is received after the first receive gate transition, and the second receive burst is received after the second receive gate transition by a similar amount, increasing one of the first rollover value and the second rollover value for at least one frame and then restoring the one of the first rollover value and the second rollover value; and in the event the first receive burst is received before the first receive gate transition, and the second receive burst is received before the second receive gate transition by a similar amount, decreasing one of the first rollover value and the second rollover value for at least one frame and then restoring the one of the first rollover value and the second rollover value.

17. The method of claim 16 further comprising:

in the event a first receive burst is received after the first receive gate transition, increasing the second rollover value, and decreasing the first rollover value by an equal amount; and in the event the first receive burst is received before the first receive gate transition, decreasing the second rollover value, and increasing the first rollover value by an equal amount.

* * * * *